(12) United States Patent
Tsurumoto et al.

(10) Patent No.: US 8,139,942 B2
(45) Date of Patent: Mar. 20, 2012

(54) REMOTE CONTROLLING SYSTEM, ELECTRONIC DEVICE, AND CONTROLLING METHOD

(75) Inventors: Takashi Tsurumoto, Saitama (JP); Masahiro Nakano, Tokyo (JP); Akira Katsuyama, Kanagawa (JP); Yasuhisa Ikeda, Chiba (JP); Tetsuya Nakamura, Ibaraki (JP); Kazunori Kikuchi, Kanagawa (JP); Takayoshi Yamasaki, Tokyo (JP)

(73) Assignee: Sony Corporation (JP)

( * ) Notice: Subject to any disclaimer, the term of this patent is extended or adjusted under 35 U.S.C. 154(b) by 811 days.

(21) Appl. No.: 12/231,091

(22) Filed: Aug. 29, 2008

(65) Prior Publication Data

US 2009/0060515 A1    Mar. 5, 2009

(30) Foreign Application Priority Data

Sep. 4, 2007    (JP) .............................. P2007-228829

(51) Int. Cl.
- H04B 10/00    (2006.01)
- H04B 10/10    (2006.01)
- H04N 5/44    (2011.01)

(52) U.S. Cl. ..... 398/106; 398/115; 398/116; 455/152.1; 455/151.1; 455/151.2; 340/10.1

(58) Field of Classification Search .................. 398/108, 398/115–116
See application file for complete search history.

(56) References Cited

U.S. PATENT DOCUMENTS

| | | | | |
|---|---|---|---|---|
| 4,904,993 A * | 2/1990 | Sato | ............................. | 340/12.5 |
| 5,500,691 A * | 3/1996 | Martin et al. | ................. | 348/734 |
| 5,585,953 A * | 12/1996 | Zavrel | ............................ | 398/115 |
| 5,675,395 A * | 10/1997 | Martin et al. | ................. | 348/734 |
| 5,812,293 A * | 9/1998 | Yen | .............................. | 398/115 |
| 5,946,120 A * | 8/1999 | Chen | ............................. | 398/155 |
| 5,999,294 A * | 12/1999 | Petsko | ........................... | 398/115 |
| 6,396,612 B1 * | 5/2002 | Bjorndahl | .................... | 398/121 |
| 6,407,779 B1 * | 6/2002 | Herz | ............................. | 348/734 |
| 6,424,285 B1 * | 7/2002 | Perdue et al. | ................. | 341/176 |
| 6,529,556 B1 * | 3/2003 | Perdue et al. | ................. | 375/260 |
| 6,570,524 B1 * | 5/2003 | Mullaly et al. | ................ | 341/176 |
| 7,774,362 B2 * | 8/2010 | Dong | ............................ | 707/781 |
| 7,805,078 B1 * | 9/2010 | Gerszberg et al. | ............ | 398/115 |
| 8,005,364 B2 * | 8/2011 | Lundholm et al. | ............ | 398/115 |
| 2003/0057936 A1 * | 3/2003 | Prockup | ..................... | 324/76.53 |
| 2004/0208591 A1 * | 10/2004 | Willebrand et al. | .......... | 398/115 |
| 2004/0214562 A1 * | 10/2004 | Adan et al. | .................... | 455/420 |
| 2006/0195553 A1 * | 8/2006 | Nakamura | .................... | 709/219 |
| 2009/0060515 A1 * | 3/2009 | Tsurumoto et al. | ........... | 398/106 |
| 2010/0104292 A1 * | 4/2010 | Na et al. | ........................ | 398/115 |
| 2010/0109850 A1 * | 5/2010 | Kovach et al. | ............. | 340/10.32 |
| 2011/0069961 A1 * | 3/2011 | Hudson et al. | ................ | 398/115 |

FOREIGN PATENT DOCUMENTS

| | | |
|---|---|---|
| JP | 5-137179 A | 6/1993 |
| JP | 6-078366 A | 3/1994 |
| JP | 2001-169368 A | 6/2001 |
| JP | 2002-016988 A | 1/2002 |

* cited by examiner

Primary Examiner — Shi K Li
Assistant Examiner — Oommen Jacob
(74) Attorney, Agent, or Firm — Lerner, David, Littenberg, Krumholz & Mentlik, LLP

(57) ABSTRACT

A remote controlling system is disclosed. An infrared remote controller generates a first serial signal containing a command corresponding to a user's operation and outputs the first serial signal by infrared communication. A radio remote controller generates a code signal containing a key number corresponding to a user's operation and outputs the code signal by radio communication. An electronic device includes a light receiving section, a radio receiving section, a selecting section, and a controlling section.

5 Claims, 7 Drawing Sheets

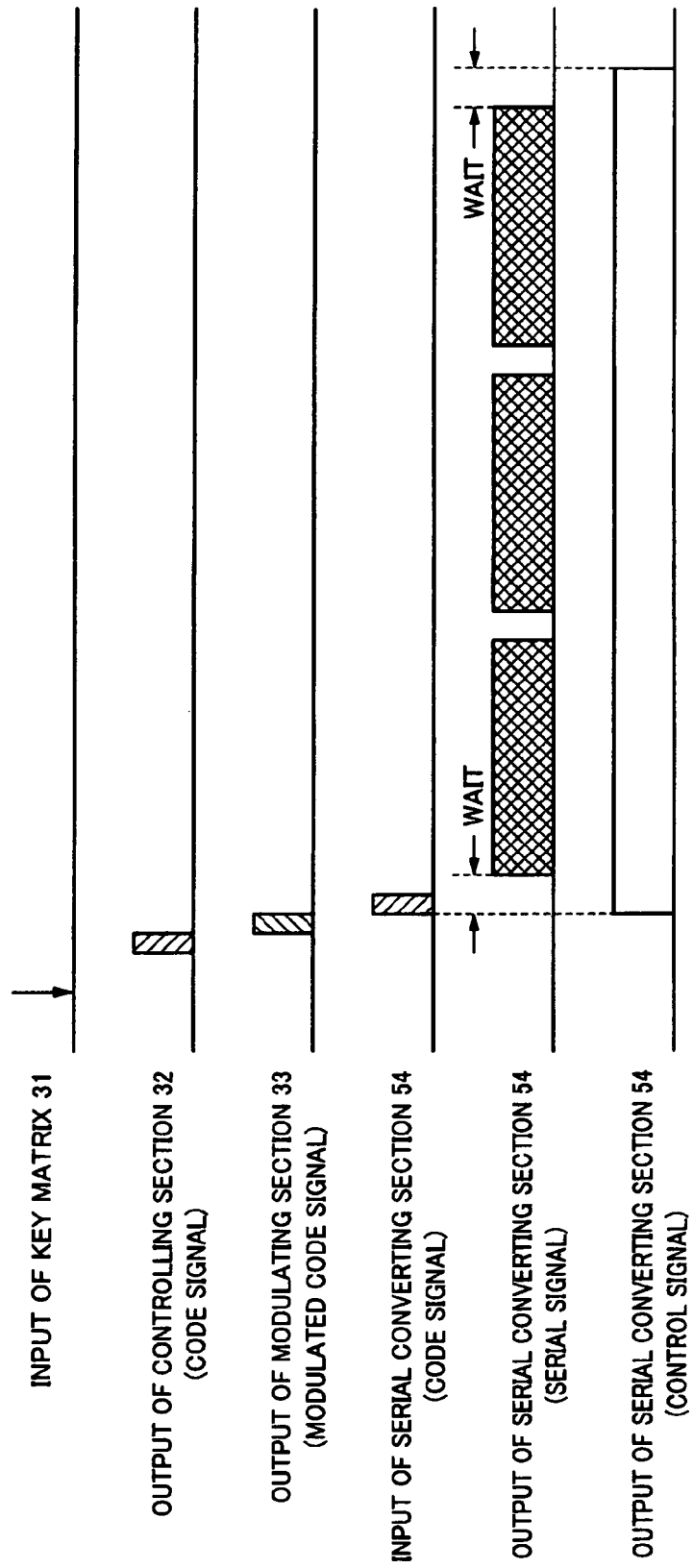

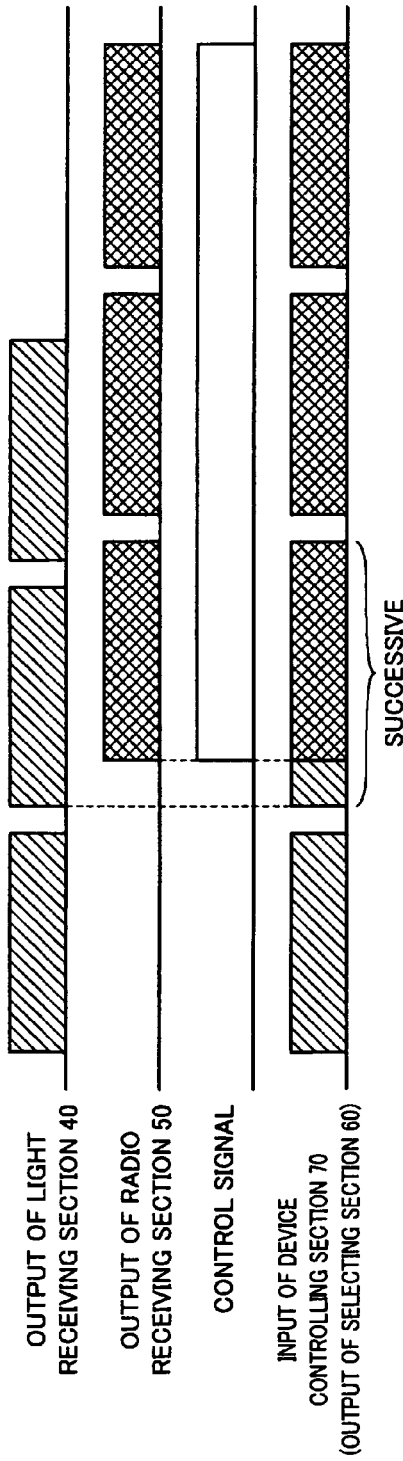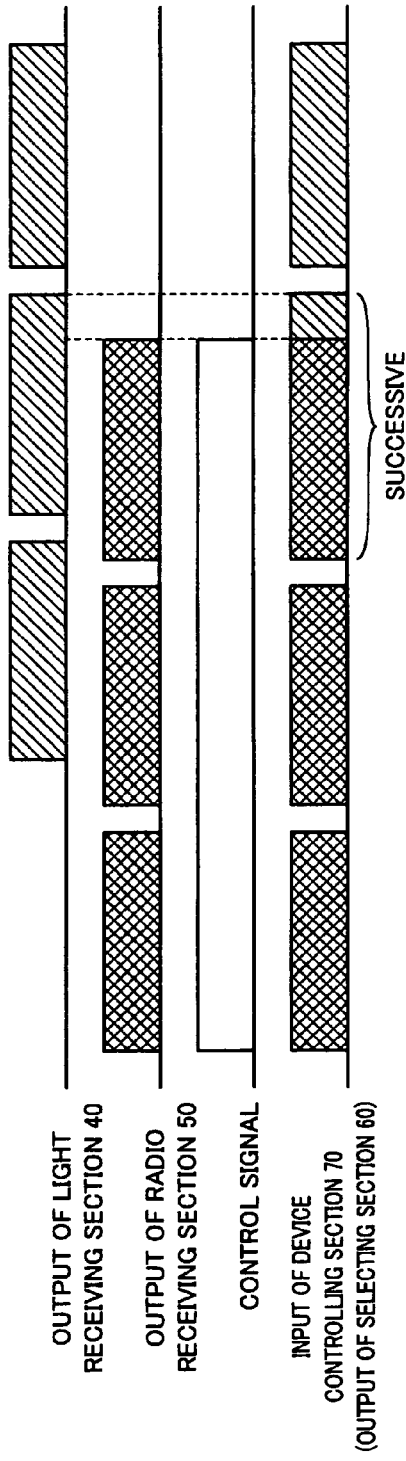

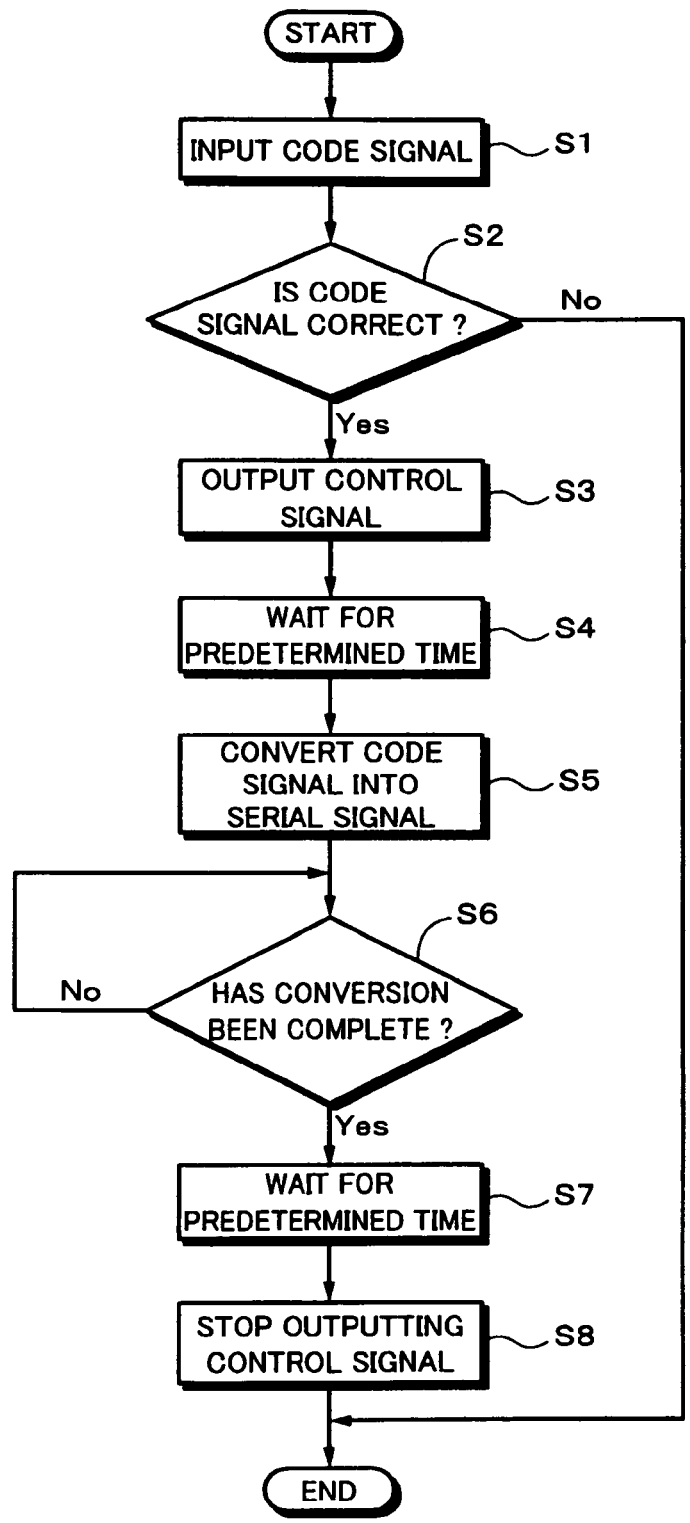

REMOTE CONTROLLING SYSTEM, ELECTRONIC DEVICE, AND CONTROLLING METHOD

CROSS REFERENCES TO RELATED APPLICATIONS

The present invention contains subject matter related to Japanese Patent Application JP 2007-228829 filed in the Japanese Patent Office on Sep. 4, 2007, the entire contents of which being incorporated herein by reference.

BACKGROUND OF THE INVENTION

1. Field of the Invention

The present invention relates to a remote controlling system, an electronic device, and a controlling method of operating electronic devices with remote controllers.

2. Description of the Related Art

As an user interface that operates an electronic device (eg, television receiver), remote controllers have been widely used. As remote controllers, infrared remote controllers using an infrared communication system have become common. For example, multi remote controllers that can operate a plurality of types of electronic devices made by a plurality of manufacturers and learning remote controllers that receive infrared light codes from a source remote controller, analyze them, and store the analyzed codes have been commercialized.

Recently, as electronic devices operated with infrared remote controllers, flat panel television receivers (hereinafter, sometimes referred to as flat panel TVs) that use a display panel (eg, liquid crystal panel or plasma display panel (PDP)) are becoming common. Flat panel TVs, however, may radiate light having the similar wavelength to that of infrared signals emitted from infrared remote controllers.

In this case, when the power of the flat panel TV is turned on, if light radiated from the display panel enters the light receiving section of the flat panel TV, the light interferes with infrared signals emitted from the infrared remote controller. As a result, it becomes difficult to operate the flat panel TV with the remote controller. In particular, flat panel TVs using a PDP may radiate light having the similar wavelength to that of infrared signals.

As a method of solving such a problem, a method of disposing an optical filter that shuts out light having the similar wavelength to that of infrared signals emitted from the infrared remote controller on the light receiving section of the flat panel TV is known. In addition, if light having the similar wavelength to that of infrared signals is radiated, a method of disposing an optical filter that shuts out light having the wavelength on the entire display panel is known.

However, if such an optical filter is disposed on the light receiving section or the entire display panel, the cost of the electronic device will adversely increase.

In such a situation, recently, radio remote controllers using the Industrial, Scientific and Medical use (ISM) band (eg, 2.4 GHz band) radio communication system have attracted attention (hereinafter, they are referred to as radio remote controllers). Since the radio remote controller transmits signals to the electronic device by radio communication, light radiated from the display panel of the electronic device does not interfere with signals transmitted from the remote controller. Thus, it is not necessary to dispose the optical filter on the light receiving section or the entire display panel of the electronic device.

The radio remote controller have features of which it can control an electronic device even if there is an obstruction therebetween and can control the electronic device without pointing itself to the electronic device.

Technique about a radio remote controller using radio communication system is described in the following document disclosed as Japanese Patent Application Laid-Open No. 2002-16988 Publication.

SUMMARY OF THE INVENTION

However, at present, since infrared remote controllers are mainstream, if the electronic device is designed to be operated only with a radio remote controller, a problem of which the user is not able to operate the electronic device with his or her infrared remote controller (eg, multi-remote controller, learning remote controller) will arise. To solve such a problem, it is necessary to allow an electronic device to be operated both with an infrared remote controller and a radio remote controller.

In view of the foregoing, it would be desirable to provide a remote controlling system, an electronic device, and a controlling method that allow an infrared remote controller and a radio remote controller to be selectably used.

According to an embodiment of the present invention, there is provided a remote controlling system. The remote controlling system includes an infrared remote controller, a radio remote controller, and a radio remote controller. The infrared remote controller generates a first serial signal containing a command corresponding to a user's operation and outputs the first serial signal by infrared communication. The radio remote controller generates a code signal containing a key number corresponding to a user's operation and outputs the code signal by radio communication. The electronic device includes a light receiving section, a radio receiving section, a selecting section, and a controlling section. The light receiving section receives the first serial signal. The radio receiving section receives the code signal, converts the code signal into a second serial signal containing a command corresponding to the key number, and generates a control signal which denotes that the code information has been received. The selecting section selects one of the first serial signal and the second serial signal based on the control signal and outputs the selected serial signal such that while the control signal is being supplied, the selecting section selects the second serial signal. The controlling section controls each section of the electronic device based on the command contained either in the first serial signal or the second serial signal selected by the selecting section.

According to an embodiment of the present invention, there is provided an electronic device. The electronic device includes a light receiving section, a radio receiving section, a selecting section, and a controlling section. The light receiving section receives a first serial signal containing a command corresponding to a user's operation for a first remote controller by infrared communication. The radio receiving section receives a code signal containing a key number corresponding to a user's operation for a second remote controller by radio communication, converts the code signal into a second serial signal containing a command corresponding to the key number, and generates a control signal which denotes that the code information has been received. The selecting section selects one of the first serial signal and the second serial signal based on the control signal and outputs the selected serial signal such that while the control signal is being supplied, the selecting section selects the second serial signal. The controlling section controls each section of the electronic device based on the command contained either in the first serial signal or the second serial signal selected by the selecting section.

According to an embodiment of the present invention, there is provided a controlling method. A first serial signal containing a command corresponding to a user's operation for a first remote controller is received by infrared communication. A code signal containing a key number corresponding to a user's operation for a second remote controller by radio communication. The code signal is converted into a second serial signal containing a command corresponding to the key number. A control signal which denotes that the code information has been received is generated. One of the first serial signal and the second serial signal is selected based on the control signal. The selected serial signal is output such that while the control signal is being supplied, the second serial signal is selected. Each step is controlled based on the command contained either in the first serial signal or the second serial signal selected at the selecting step.

As described above, according to the foregoing embodiments of the present invention, A first serial signal containing a command corresponding to a user's operation for a first remote controller is received by infrared communication. A code signal containing a key number corresponding to a user's operation for a second remote controller by radio communication. The code signal is converted into a second serial signal containing a command corresponding to the key number. A control signal which denotes that the code information has been received is generated. One of the first serial signal and the second serial signal is selected based on the control signal. The selected serial signal is output such that while the control signal is being supplied, the second serial signal is selected. Each step is controlled based on the command contained either in the first serial signal or the second serial signal selected at the selecting step. Thus, even if control is being performed by the first remote controller, control by the second remote controller is prioritized over control by the first remote controller.

According to an embodiment of the present invention, when a code signal supplied from a radio remote controller is detected, a control signal is generated. An input of a selecting section is selected on the basis of a control signal. Thus, as an effect, both an infrared remote controller and a radio remote controller can be selectively used.

According to an embodiment of the present invention, an input of a light receiving section is normally selected. If a control signal is supplied to a selecting section, an input of a radio receiving section is selected. Thus, as an effect, control by the radio remote controller can be prioritized over control by the infrared remote controller.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a timing chart showing timings of signals of individual sections;

FIG. 6A and FIG. 6B are timing charts describing a selection controlling method; and FIG. 7 is a flow chart describing a flow of processes of a serial converting section.

DETAILED DESCRIPTION OF THE PREFERRED EMBODIMENTS

Figure 1:
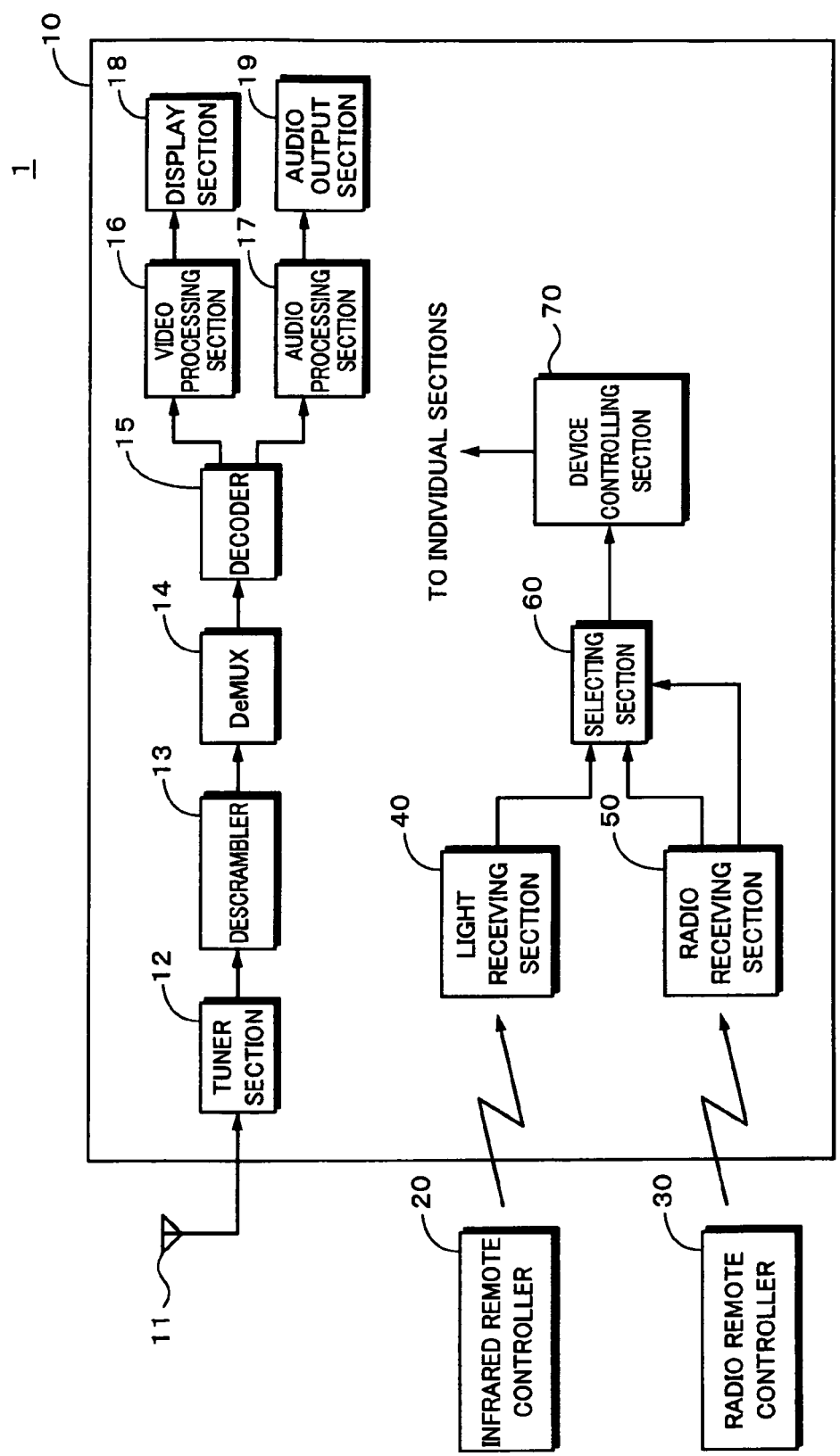
FIG. 1 is a block diagram showing an exemplary structure of a remote controlling system according to an embodiment of the present invention.

Next, with reference to the accompanying drawings, an embodiment of the present invention will be described. As shown in FIG. 1, a remote controlling system 1 according to an embodiment of the present invention is composed of an electronic device 10, an infrared remote controller 20 as a first remote controller, and a radio remote controller 30 as a second remote controller. In this example, as the electronic device 10, a television receiver that can receive digital television broadcasts will be described.

The infrared remote controller 20 generates an infrared signal containing a command corresponding to a user's operation of an operation key disposed on the infrared remote controller 20 and transmits the infrared signal to the electronic device 10 by infrared communication.

The radio remote controller 30 generates a transmission signal containing a command corresponding to a user's operation of an operation key disposed on the radio remote controller 30 and transmits the transmission signal to the electronic device 10 by radio communication. Examples of the radio communication system include the physical layer of the Instituted of Electrical and Electronics Engineers (IEEE) 820.15.4. IEEE 802.15.4 is the name of a short range radio network standard called personal area network (PAN) or wireless PAN (WPAN).

The electronic device 10 has a tuner section 12, a descrambler 13, a demultiplexer (DeMUX) section 14, a decoder 15, a video processing section 16, an audio processing section 17, a display section 18, an audio output section 19, a light receiving section 40, a radio receiving section 50, a selecting section 60, and a device controlling section 70.

The electronic device 10 receives a radio wave of a digital television broadcast from a broadcasting facility (not shown) with an antenna connected outside the electronic device 10. The received radio wave of the digital television broadcast is supplied to the tuner section 12. The tuner section 12 selects a modulation signal of a predetermined frequency from the radio wave of the digital television broadcast supplied through the antenna 11. The tuner section 12 performs predetermined signal processes (eg, demodulating process, error correcting process) for the selected modulated signal and outputs the resultant transport stream (TS) to the descrambler 13.

If necessary, the descrambler 13 performs a process of descrambling the supplied TS and outputs the descrambled TS to the demultiplexer section 14. The demultiplexer section 14 filters the supplied TS based on a value of packet identification (PID) that identifies each TS packet contained in the header section, extracts necessary streams (eg, video stream, audio stream) from the TS in which these streams have been multiplexed, and supplies the extracted streams to the decoder 15.

The decoder 15 performs a decoding process for the video stream and the audio stream and outputs a video signal and an audio signal. The decoded video signal is supplied to the video processing section 16, whereas the decoded audio signal is supplied to the audio processing section 17.

The video processing section 16 performs predetermined image processes (eg, noise reduction, resolution conversion, frame interpolation) for the supplied video signal and supplies the resultant video signal to the display section 18. Examples of the display section 18 include a cathode ray tube (CRT) and a liquid crystal display (LCD). The audio processing section 17 performs a predetermined audio process for the supplied audio signal and outputs the resultant audio signal from the audio output section 19.

The light receiving section 40 receives an infrared signal from the infrared remote controller 20, performs a predetermined signal process for the infrared signal, and supplies the resultant serial signal as a serial code of the infrared remote controller 20 to the selecting section 60.

The radio receiving section 50 receives a transmission signal from the radio remote controller 30, performs a predetermined process for the transmission signal, and supplies the resultant serial signal as a serial code of the radio remote controller 30 to the selecting section 60. In addition, the radio receiving section 50 generates a control signal that causes the selecting section 60 (that will be described later) to select a transmission signal that the radio receiving section 50 receives and supplies the control signal to the selecting section 60.

The selecting section 60 is, for example, a switch that selects one of the serial signals received from the light receiving section 40 and the radio receiving section 50 based on the control signal received from the radio receiving section 50 and supplies the selected serial signal to the device controlling section 70. The selecting section 60 normally selects the input of the light receiving section 40 and outputs the serial signal supplied from the light receiving section 40. While the control signal is being supplied from the radio receiving section 50 to the selecting section 60, it selects the input of the radio receiving section 50 and outputs the serial signal supplied from the radio receiving section 50.

The device controlling section 70 controls each section of the electronic device 10 with a random access memory (RAM) (not shown) as a work memory according to a program preloaded in a read-only memory (ROM) (not shown). The device controlling section 70 receives the serial signal from the selecting section 60 and controls each section of the electronic device 10 according to a command contained in the serial signal.

Figure 2A:
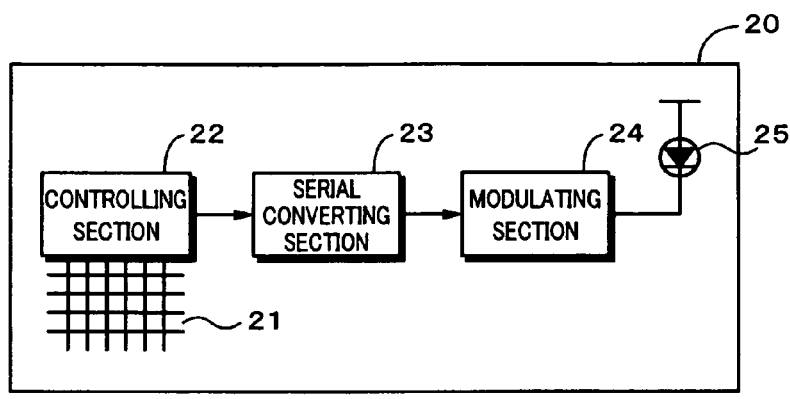
FIG. 2A and FIG. 2B are block diagrams showing exemplary structures of an infrared remote controller and a radio remote controller, respectively.

Next, an exemplary structure of the infrared remote controller 20 will be described. As shown in FIG. 2A, the infrared remote controller 20 has a key matrix 21, a controlling section 22, a serial converting section 23, a modulating section 24, and a light emitting section 25. The key matrix 21 detects what key has been pressed in the operation keys of the infrared remote controller 20 and supplies a detection signal that represents a detected result to the controlling section 22.

The controlling section 22 generates a code signal containing a key number of the pressed key based on the detection signal supplied from the key matrix 21 and supplies the code signal to the serial converting section 23. The serial converting section 23 converts the code signal supplied from the controlling section 22 into a serial signal that is a serial code of the remote controller based on a predetermined format and supplies the serial code to the modulating section 24. Examples of the format of which the code signal is converted into the serial code include Serial Infrared Remote Control System (SIRCS).

Figure 3A:
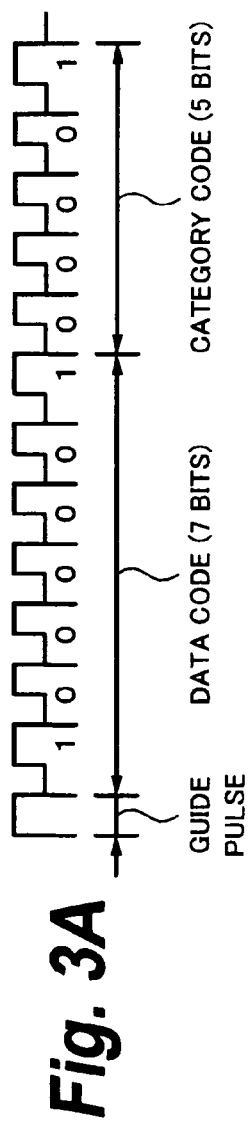
FIG. 3A, FIG. 3B, and FIG. 3C are schematic diagrams describing serial signals.
Figure 3B:
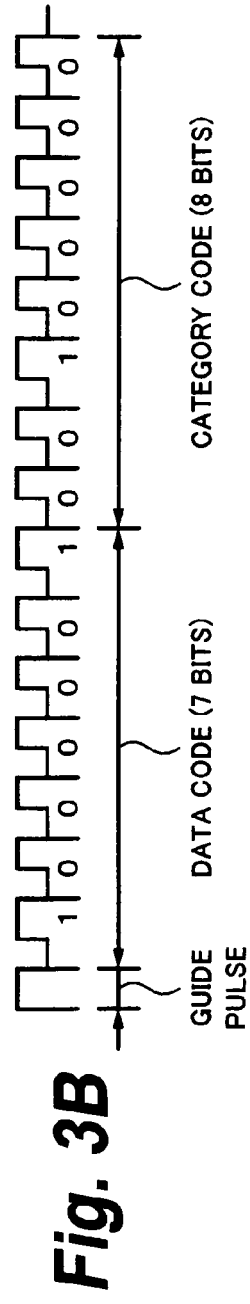
Figure 3C:
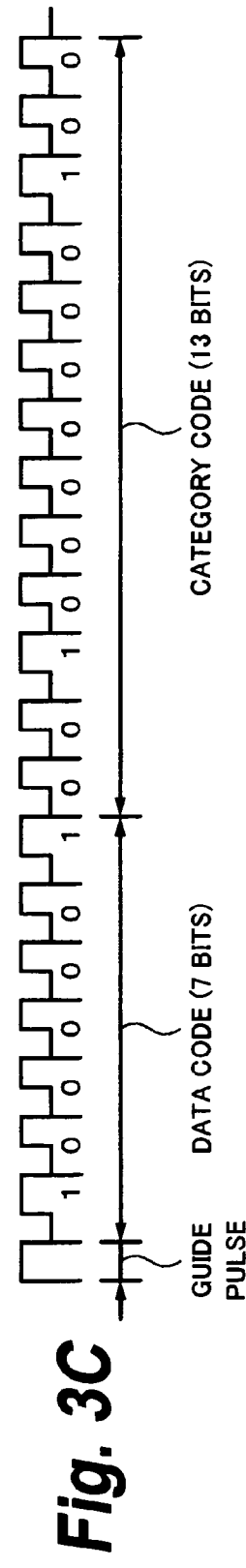

As shown in FIG. 3A and FIG. 3B, a serial signal defined in SIRCS contains a guide pulse that represents the beginning of the serial signal, a data code that describes a command associated with each operation key as control data of the electronic device 10, and a category code that represents the category of the electronic device 10. The number of bits of the category code depends on the manufactured year of the electronic device 10. The category code of the serial signal shown in FIG. 3A is composed of five bits. The category code of the serial signal shown in FIG. 3B is composed of eight bits. The category code of the serial signal shown in FIG. 3C is composed of 13 bits.

Returning to FIG. 2A, the remote controlling system 1 is further described. The modulating section 24 modulates a carrier of a predetermined frequency based on a serial signal supplied from the serial converting section 23 and supplies the modulated signal to the light emitting section 25. The light emitting section 25 outputs an infrared signal as a remote control signal based on the modulated serial signal supplied from the modulating section 24.

Figure 2B:
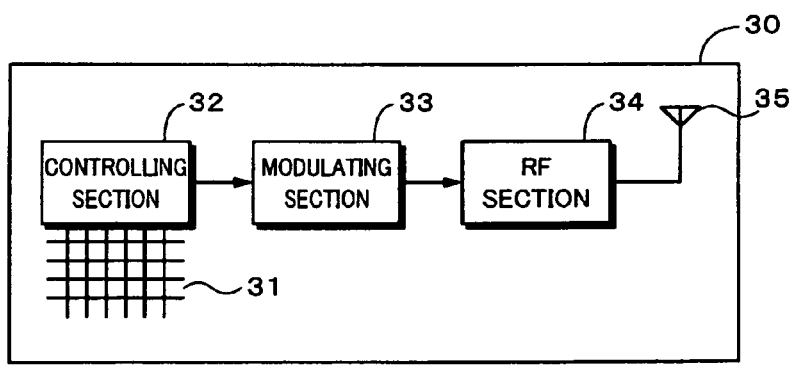

Next, an exemplary structure of the radio remote controller 30 will be described. As shown in FIG. 2B, the radio remote controller 30 has a key matrix 31, a controlling section 32, a modulating section 33, an RF section 34, and an antenna 35. The key matrix 31 detects what key has been pressed in the operation keys of the radio remote controller 30 and supplies a detection signal that represents the detected result to the controlling section 32.

The controlling section 32 generates a code signal corresponding to the pressed key based on the detection signal supplied from the key matrix 31 and supplies the code signal to the modulating section 33. The modulating section 33 performs a predetermined modulating process for the code signal supplied from the controlling section 32 and supplies the modulated code signal to the RF section 34. Examples of the modulating system include Offset Quadrature Phase Shift Keying (OQPSK) and spectrum spread system. The RF section 34 up-converts the modulation code signal supplied from the modulating section 33 into a predetermined frequency band, amplifies the power of the modulated code signal, and transmits the resultant transmission signal through the antenna 35.

Figure 4A:
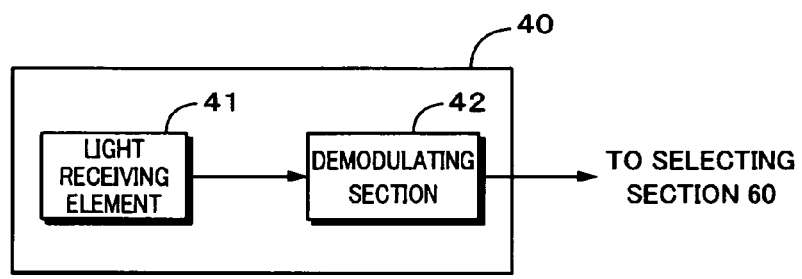
FIG. 4A and FIG. 4B are block diagrams showing exemplary structures of a light receiving section and a radio receiving section, respectively.

Next, an exemplary structure of the light receiving section 40 will be described. As shown in FIG. 4A, the light receiving section 40 has a light receiving element 41 and a demodulating section 42. The light receiving element 41 is, for example, a photo diode. The light receiving element 41 receives an infrared signal from the infrared remote controller 20, converts the infrared signal into an electric signal, and supplies the electric signal to the demodulating section 42. The demodulating section 42 demodulates the electric signal supplied from the light receiving element 41 into a serial signal and supplies the demodulated serial signal to the selecting section 60.

Figure 4B:
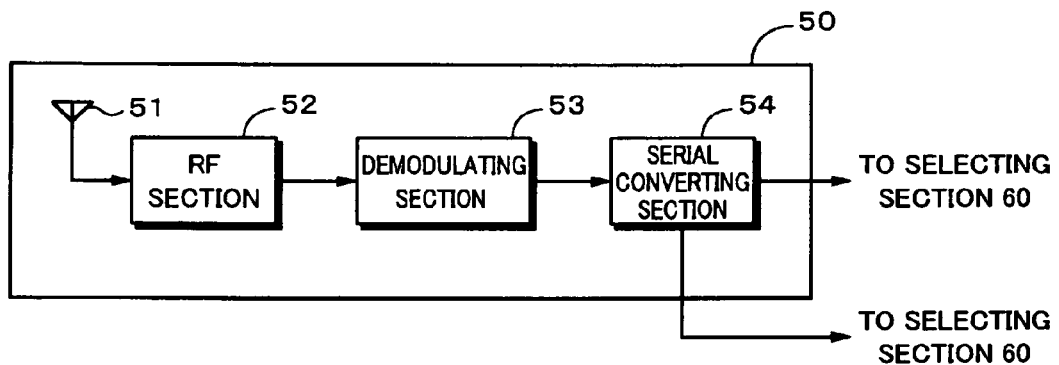

Next, an exemplary structure of the radio receiving section 50 will be described. As shown in FIG. 4B, the radio receiving section 50 has an antenna 51, an RF section 52, a demodulating section 53, and a serial converting section 54. The RF section 52 receives a transmission signal from the radio remote controller 30 through the antenna 51, down-converts the transmission signal into a predetermined frequency band, and supplies the obtained modulated code signal to the demodulating section 53.

The demodulating section 53 performs a predetermined demodulating process for the modulated code signal supplied from the RF section 52 and supplies the demodulated code signal to the serial converting section 54. Examples of the demodulating system includes OQPSK and spectrum spread system, which are the same as those used in the radio remote controller 30.

The serial converting section 54 converts the code signal supplied from the demodulating section 53 into a serial signal based on a predetermined format and supplies the converted serial signal to the selecting section 60. The format of which the code signal is converted into the serial signal is the same as that used in the infrared remote controller 20. In addition, when the serial converting section 54 receives the code signal from the demodulating section 53, the serial converting section 54 generates a control signal that denotes that it has received the code signal and supplies the control signal to the selecting section 60.

Next, a selection controlling method according to an embodiment of the present invention will be described. According to an embodiment of the present invention, the electronic device 10 controls the selecting section 60 is controlled on the basis of a control signal generated upon reception of a transmission signal from the radio remote controller 30 and selects a serial signal based on a signal received from the infrared remote controller 20 or a serial signal based on a signal received from the radio remote controller 30.

FIG. 5 shows timings of various signals after the user operates an operation key of the radio remote controller 30 until the electronic device 10 is controlled. When the user operates an operation key of the radio remote controller 30, a detection signal corresponding to the operation key is output from the key matrix 31. The controlling section 32 generates a code signal corresponding to the operation key based on the detection signal that is output from the key matrix 31. The modulating section 33 modulates the code signal generated in the controlling section 32 and generates a modulated code signal. The modulated code signal is transmitted as an infrared signal to the electronic device 10 through the RF section 34 and the antenna 35.

The electronic device 10 receives the infrared signal from the radio remote controller 30 through the antenna 51 and supplies a code signal demodulated by the demodulating section 53 to the serial converting section 54 through the RF section 52.

When the code signal is input from the demodulating section 53 to the serial converting section 54, it starts generating a control signal that causes the selecting section 60 to select the input of the radio receiving section 50 and outputs the control signal to the selecting section 60. After the serial converting section 54 has started outputting the control signal and a predetermine time has elapsed, the serial converting section 54 starts converting the code signal into a serial signal.

When the serial converting section 54 converts a code signal into a serial signal, the serial converting section 54 outputs the same serial signal corresponding to one code signal a plurality of times (eg, three times). This is because the device controlling section 70 determines whether or not the input serial signal is correct. For example, if a predetermined number (eg, two of three) of serial signals that have been input are the same, the device controlling section 70 determines that they be correct signals and controls each section of the remote controlling system 1 according to a command contained in the serial signals.

After the code signal has been converted into the serial signal and a predetermine time has elapsed, the output of the control signal is complete. While the control signal is being supplied from the serial converting section 54 to the selecting section 60, the selecting section 60 selects the input of the radio receiving section 50.

After the serial converting section 54 has started outputting the control signal and a predetermine time has elapsed, the serial converting section 54 starts converting the code signal into the serial signal. After the serial converting section 54 has converted the code signal into the serial signal and a predetermined time has elapsed, the serial converting section 54 completes outputting the control signal. This is because when the serial signal is input from the selecting section 60 to the device controlling section 70, the converted serial signal and a serial signal adjacent thereto are prevented from being determined to be one successive signal.

For example, it is assumed that both the control signal and the serial signal are simultaneously output from the serial converting section 54 and their outputs are simultaneously complete. As shown in FIG. 6A, while the user is operating the infrared remote controller 20 to control the electronic device 10, if the radio remote controller 30 is operated, since the control signal is supplied from the serial converting section 54 to the selecting section 60, it selects the input of the radio receiving section 50.

In this case, immediately after the selecting section 60 outputs the serial signal that is input from the light receiving section 40 to the device controlling section 70, the selecting section 60 outputs the serial signal that is input from the radio receiving section 50 to the device controlling section 70. Thus, the device controlling section 70 recognizes that the serial signal that is input from the radio receiving section 50 and the serial signal that has been input from the light receiving section 40 are one successive signal.

In contrast, as shown in FIG. 6B, while the user is operating the radio remote controller 30 to control the electronic device 10, if the infrared remote controller 20 is operated, after the supply of the control signal from the serial converting section 54 is complete, the selecting section 60 selects the input of the light receiving section 40.

In this case, immediately after the serial signal that is input from the radio receiving section 50 is complete, the selecting section 60 outputs the serial signal that is input from the light receiving section 40 to the device controlling section 70. Thus, the device controlling section 70 recognizes that the serial signal that is input from the radio receiving section 50 and the serial signal that is input from the light receiving section 40 thereafter are one successive signal.

As described above, if the control signal is output while the serial signal is being output from the serial converting section 54, the device controlling section 70 recognizes that adjacent serial signals are one successive signal. Thus, the device controlling section 70 is not able to correctly control the electronic device 10.

Thus, according to an embodiment of the present invention, after the serial converting section 54 has started outputting the control signal and a predetermined time has elapsed, the serial converting section 54 starts outputting the serial signal. After the serial converting section 54 has output the serial signal and a predetermine time has elapsed, the serial converting section 54 completes outputting the control signal. As a result, the device controlling section 70 can recognize that these serial signals are different serial signals.

Even if the light receiving section 40 is normally selected as the input of the selecting section 60 and the electronic device 10 is being operated with the infrared remote controller 20, when the control signal is supplied to the selecting section 60, the input of the radio receiving section 50 is selected by the selecting section 60. Thus, the radio remote controller 30 can prioritize control of the electronic device 10.

Next, with reference to a flow chart shown in FIG. 7, a flow of processes of the serial converting section 54 will be described. It is assumed that the following processes are performed under the control of the serial converting section 54 unless otherwise specified.

At step S1, a code signal is input to the serial converting section 54. At step S2, it is determined whether or not the input code signal is correct. If the determined result denotes that the input code signal is correct, the flow advances to step S3. At step S3, a control signal that causes the selecting section 60 to select the input of the radio receiving section 50 is started to be generated. The control signal is output to the selecting section 60. At step S4, after the control signal has been started to be generated and a predetermined time has elapsed, the flow advances to step S5. At step S5, a converting process of converting the input code signal into a serial signal is started.

At step S6, it is determined whether or not the converting process for the serial signal has been complete. If the determined result denotes that the converting process for the serial signal has been complete, the flow advances to step S7. In contrast, if the determined result at step S6 denotes that the converting process for the serial signal has not been complete, the flow returns to step S6.

At step S7, after the conversion for the serial signal has been complete and a predetermined time has elapsed, the flow advances to step S8. At step S8, the control signal is stopped to be generated and the series of processes are complete.

In contrast, if the determined result at step S2 denotes that the input code signal is not correct, the converting process for the serial signal is not performed and the series of processes are complete.

Thus, according to this embodiment of the present invention, when a transmission signal of the radio remote controller 30 is detected, a control signal is generated. The input of the selecting section 60 is changed on the basis of the control signal. Thus, both the infrared remote controller 20 and the radio remote controller 30 can be selectively used.

In addition, according to an embodiment of the present invention, the input of the light receiving section 40 is normally selected by the selecting section 60. If the control signal is supplied to the selecting section 60, the input of the radio receiving section 50 is selected. Thus, even if the electronic device 10 is controlled both by the radio remote controller 30 and the electronic device 10, control of the electronic device 10 by the radio remote controller 30 can be prioritized.

It should be understood by those skilled in the art that various modifications, combinations, sub-combinations and alternations may occur depending on design requirements and other factors insofar as they are within the scope of the appended claims or the equivalents thereof. For example, the electronic device 10 is not limited to a television receiver, but an audio/video device (eg, digital video recorder (DVR), video cassette recorder (VCR), video tape recorder (VTR), satellite broadcast tuner, cable television tuner, digital versatile disc (DVD) recorder, Blu-ray Disc (BD) recorder, Compact Disc (CD) player, audio amplifier) and a home electric appliance (eg, refrigerator).

In addition, the control signal supplied to the selecting section 60 is not limited to one generated by the serial converting section 54. Instead, the control signal may be generated by detecting a transmission signal received by the antenna 51.

The selecting section 60 that selects the serial signal that is output from the light receiving section 40 and the serial signal that is output from the radio receiving section 50 was described as a switch. Instead, with a difference between impedances of outputs of the light receiving section 40 and the radio receiving section 50, a serial signal that is output from the selecting section 60 may be selected.

What is claimed is:

1. A remote controlling system, comprising:
an infrared remote controller which generates a first serial signal containing a command corresponding to a user's operation and outputs the first serial signal by infrared communication;
a radio remote controller which generates a code signal containing a key number corresponding to a user's operation and outputs the code signal by radio communication; and
an electronic device having:
a light receiving section which receives the first serial signal and outputs the first serial signal,
a radio receiving section which receives the code signal, converts the code signal into a second serial signal containing a command corresponding to the key number, and generates a control signal which denotes that the code information has been received, and outputs the second serial signal and the control signal,
a selecting section which receives the first serial signal, the second serial signal and the control signal and which selects one of the first serial signal and the second serial signal based on the control signal and outputs the selected serial signal such that while the control signal is being supplied, the selecting section selects the second serial signal, and
a controlling section which controls the electronic device based on the first serial signal or the second serial signal selected by the selecting section,
wherein the radio receiving section starts converting the code signal into the second serial signal after the radio receiving section has started generating the control signal and a predetermined time has elapsed, and
the radio receiving section completes generating the control signal after the radio receiving section has completed outputting the second serial signal to the selecting section and a predetermined time has elapsed.

2. The remote controlling system as set forth in claim 1, wherein the radio receiving section has a serial converting section which converts the code signal into the second serial signal, and
wherein the serial converting section generates the control signal based on the code signal.

3. The remote controlling system as set forth in claim 1, wherein the radio receiving section starts generating the control signal when the code signal is input.

4. An electronic device comprising:
a light receiving section which receives a first serial signal containing a command corresponding to a user's operation for a first remote controller by infrared communication and outputs the first serial signal;
a radio receiving section which receives a code signal containing a key number corresponding to a user's operation for a second remote controller by radio communication, converts the code signal into a second serial signal containing a command corresponding to the key number, and generates a control signal which denotes that the code information has been received, and outputs the second serial signal and the control signal;
a selecting section which receives the first serial signal, the second serial signal and the control signal and which selects one of the first serial signal and the second serial signal based on the control signal and outputs the selected serial signal such that while the control signal is being supplied, the selecting section selects the second serial signal; and a controlling section which controls the electronic device based on the command contained either in the first serial signal or the second serial signal selected by the selecting section, wherein the radio receiving section starts converting the code signal into the second serial signal after the radio receiving section has started generating the control signal and a predetermined time has elapsed, and the radio receiving section completes generating the control signal after the radio receiving section has completed outputting the second serial signal to the selecting section and a predetermined time has elapsed.

5. A controlling method for controlling an electronic device, comprising the steps of:

receiving a first serial signal containing a command corresponding to a user's operation for a first remote controller by infrared communication and outputting the first serial signal;

receiving by use of a radio receiving section a code signal containing a key number corresponding to a user's operation for a second remote controller, converting the code signal into a second serial signal containing a command corresponding to the key number, and generating a control signal which denotes that the code information has been received, and outputting the second. serial signal and the control signal;

selecting by use of a selecting section one of the first serial signal and the second serial signal based on the control signal and outputting the selected serial signal such that while the control signal is being supplied, the second serial signal is selected; and controlling the electronic device based on the command contained either in the first serial signal or the second serial signal selected at the selecting step, wherein the radio receiving section starts converting the code signal into the second serial signal after the radio receiving section has started generating the control signal and a predetermined time has elapsed, and the radio receiving section completes generating the control signal after the radio receiving section has completed outputting the second serial signal to the selecting section and a predetermined time has elapsed.

\* \* \* \* \*